United States Statutory Invention Registration [19]

[11] Reg. Number: H405

Covey [43] Published: Jan. 5, 1988

[54] ROCKET/LAUNCHER INTERFACE

[75] Inventor: James H. Covey, Snohomish, Wash.

[73] Assignee: The United States of America as represented by the Secretary of the Army, Washington, D.C.

[21] Appl. No.: 90,826

[22] Filed: Aug. 24, 1987

[51] Int. Cl.[4] ..... F41F 3/04

[52] U.S. Cl. ..... 89/1.816; 102/520

*Primary Examiner*—David H. Brown

*Attorney, Agent, or Firm*—John C. Garvin, Jr.; Freddie M. Bush; James T. Deaton

[57] ABSTRACT

Sabot adapters are provided for mounting along the outer periphery of a rocket on opposite sides of the center of gravity with the sabot adapters at each location including inner and outer ring shaped structures that are made of segments and telescoped together with tapering surfaces so that as the two ring structures are moved together they expand radially to fill the radial spacing between the rocket and a rocket launch tube to provide support for the rocket and cause accurate firing of the rocket.

4 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ROCKET/LAUNCHER INTERFACE

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE INVENTION

In the past, many sabot adaptors have not completely fit the launcher or the rocket mounted in the launcher or both to provide a good mounting or fit for launching the rocket. Therefore, there is a need for sabot adaptors by which a rocket can be more accurately and easily fitted into the launcher.

Accordingly, it is an object of this invention to provide sabot adaptors in which the adaptors are spaced apart along the outer surface of a rocket and within the internal diameter of a launch tube, with the adaptor sections being tapered in opposite directions so that as the sections are moved together the outer diameter is expanded to snuggly fit the inner diameter of the launch tube.

Another object of this invention is to provide an adaptor sabot device which enables a better system accuracy to be achieved at low cost.

Still another object of this invention is to enable missile installation to be achieved in the launch tube faster than previous launch assemblies which have been hindered due to interference of the adaptor relative to the launcher.

Still another object of this invention is to provide an adaptor sabot arrangement which allows a good fit between the rocket and launch tube even though the launch tube may not be identical in size to other launch tubes used for the same purpose.

Other objects and advantages of this invention will be obvious to those skilled in this art.

SUMMARY OF THE INVENTION

In accordance with this invention, sabot mounting of a rocket in a launch tube is provided in which two inner ring sections and two outer ring sections are mounted around the rocket at two-spaced positions for mounting the rocket in a launch tube and to allow the outer two sections of the sabot to move and adjust the mounting of the rocket in the launch tube even though the inside diameter of the launch tube may vary from tube to tube and further the sabot sections are squeezed as the rocket is launched by the movement of the inner and outer ring sections together to cause the rocket to be launched in a manner similiar to a bullet from a gun barrel.

DESCRIPTION OF THE PREFERRED EMBODIMENT

Figure 5:
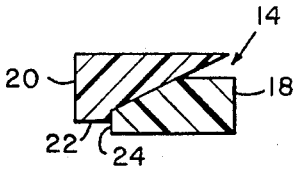
FIG. 5 is a sectional view illustrating the sabot sections when they are fully telescoped together and as the rocket is being launched from the launch tube.

Referring now to the drawing, a missile 10 of conventional structure is illustrated and has a center of gravity 12 with sabot 14 mounted just forward of center of gravity 12 and inside the inner diameter of launch tube 16. Another sabot 14 is mounted at the rear of missile 10 and inside launch tube 16 to provide a pair of spaced apart sabots 14 for supporting rocket 10. The sabots commonly used for supporting a rocket in a launch tube do not generally provide accurate fit relative to the launch tube or the rocket or both. Therefore, applicant's sabots 14 are adjustable adaptors that include inner segments 18 that fit around the periphery of rocket 10 and outer segments 20 that are larger in diameter and fit within the inner diameter of launch tube 16 with members 18 and 20 having tapered surfaces that cause segments 20 to expand outwardly radially as the segments are moved together to provide a tight fit between the sabot segments, the outer surface of rocket 10 and the inner diameter surface of launch tube 16. Outer segments 20 have shoulders 22 that engage end surfaces 24 of segments 18 when the tapered surfaces have been completely pushed together and this occurs when the rocket is being launched from the launch tube to assume the position as illustrated in FIG. 5.

Figure 1:
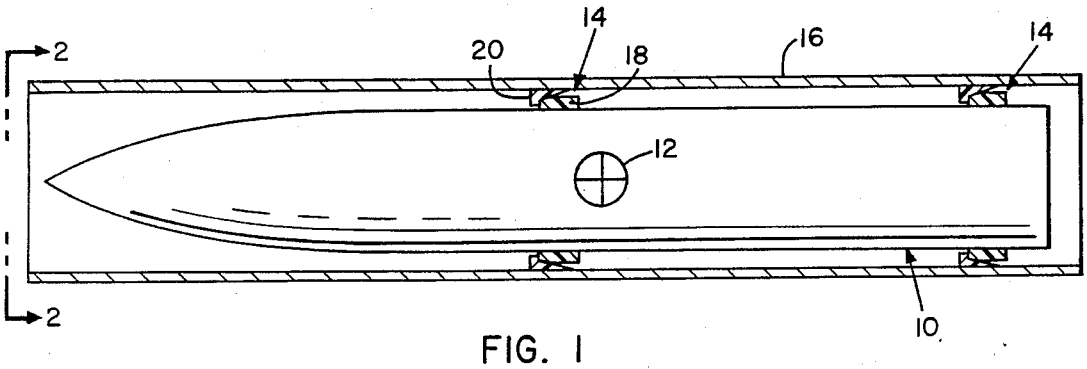
FIG. 1 is a sectional view of a rocket mounted in a launch tube with the sabot arrangement in accordance with this invention.
Figure 2:
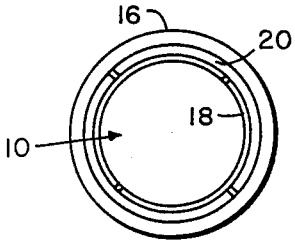
FIG. 2 is a sectional view along line 2—2 of FIG. 1.
Figure 3:
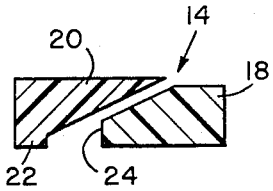
FIG. 3 is a sectional view illustrating how the sabot sections fit together.
Figure 4:
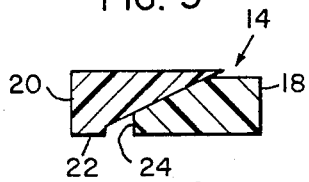
FIG. 4 is a sectional view illustrating a second position of the sabot sections.

Sabot adaptors 14 are mounted relative to rocket 10 and launch tube 16 first in the condition illustrated in FIG. 3 which is a relaxed position and then they are moved into a second position as illustrated in FIG. 4 to fully support the rocket inside launch tube 16. In this position with the segments in the position illustrated in FIG. 4, the gap between the outer surface of rocket 10 and the inner surface of launch tube 16 is spanned by sabots 14 even though the diameter of various launch tubes 16 may vary. That is, sabot adaptors 14 adapt to the particular machining of the parts used so that exact sizing does not have to be used when sabots of the type used here are employed. Upon flight of rocket 10 from launch tube 16, the inertia from segments 18 force segments 20 tighter into tube 16, and/or tube 16 with rails if desired, and so that the material of segments 20 which fill the launch tube is extruded at the periphery as the launch proceeds. This analogy of segments 20 relative to launch tube 16 is similiar to a bullet fitting in a gun barrel.

Figure 6:
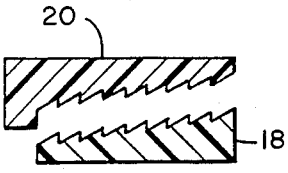
FIG. 6 is a sectional view illustrating ratchet like surfaces on the tapered surfaces of the sabot sections.

Sabot adaptors 14 fit the tube and launch assembly and thereby promote accuracy, range, and handling characteristics. Sabots 14 are used only once and they are made of low cost materials such as plastics. Inner sabot sections 18 are preferably made of a plastic that is more rigid than the plastic of outer segments 20 and inner segments 18 are preferably filled with a fiber such as fiberglass or other fiber filling material to cause inner segments 18 to be more rigid. Also if desired, the tapered surfaces of segments 18 and 20 can have ratchet shaped locking surfaces as illustrated in FIG. 6 to act as a locking mechanism as the segments are moved together when they have been positioned around rocket 10 and inside launch tube 16.

I claim:

1. A sabot arrangement for supporting a rocket inside a rocket launch tube, said sabot arrangement including two sabot adaptors spaced along the outer periphery of the rocket with one of said sabot adaptors being located forward of the center of gravity of said rocket and the other of said sabots being located near the rear of the rocket, each said sabot adaptor including an inner segmented ring shaped structure that has a radially outer tapered surface and an outer segmented ring shaped structure with an inner tapered surface that mates with the tapered surface of said inner segmented ring shaped structure, and said outer segmented ring shaped structure having an outer surface for engaging the inner surface of the launch tube.

2. A sabot arrangement as set forth in claim 1, wherein said tapered surfaces of said inner segmented ring shaped structure and said outer segmented ring shaped structure have ratchet shaped locking surfaces.

3. A sabot arrangement as set forth in claim 1, wherein said inner segmented ring shaped structure includes two sections and said outer segmented ring shaped structure includes two sections and said outer segmented ring shaped structure having a shoulder that is adapted to contact an end surface of said inner segmented ring shaped structure to limit the amount of outward movement of said outer ring shaped structure.

4. A sabot arrangement as set forth in claim 3, wherein said inner segmented ring shaped structure is made of a plastic material that is fiber filled to make said inner segmented ring shaped structure substantially rigid and said outer ring structure being made of a plastic material that is softer than said inner segmented ring shaped structure to render the outer segmented ring shaped structure extrudible.

* * * * *